(No Model.) 4 Sheets—Sheet 1.

N. W. PRATT.
SECTIONAL STEAM BOILER.

No. 415,976. Patented Nov. 26, 1889.

WITNESSES,

INVENTOR.
Nat. W. Pratt
ATTORNEY.

(No Model.) 4 Sheets—Sheet 2.
N. W. PRATT.
SECTIONAL STEAM BOILER.

No. 415,976. Patented Nov. 26, 1889.

WITNESSES, INVENTOR.

ATTORNEY.

N. PETERS, Photo-Lithographer, Washington, D. C.

(No Model.) 4 Sheets—Sheet 3.

N. W. PRATT.
SECTIONAL STEAM BOILER.

No. 415,976. Patented Nov. 26, 1889.

WITNESSES. INVENTOR.

(No Model.)  4 Sheets—Sheet 4.

N. W. PRATT.
SECTIONAL STEAM BOILER.

No. 415,976.  Patented Nov. 26, 1889.

WITNESSES.

INVENTOR.
Nat W. Pratt
ATTORNEY.

UNITED STATES PATENT OFFICE.

NAT. W. PRATT, OF BROOKLYN, NEW YORK.

SECTIONAL STEAM-BOILER.

SPECIFICATION forming part of Letters Patent No. 415,976, dated November 26, 1889.

Application filed March 5, 1889. Serial No. 301,952. (No model.)

*To all whom it may concern:*

Be it known that I, NAT. W. PRATT, a citizen of the United States, residing at Brooklyn, in the county of Kings and State of New York, have invented certain new and useful Improvements in Sectional Steam-Boilers, of which the following is a specification.

This invention has for its object the adaptation of the construction of water-tube boilers to sustaining high degrees of pressure. The entire structure is composed of wrought-metal tubes, either cylindrical or pressed by dies into such various forms other than cylindrical as may be required for such parts, for instance, as the serpentine tube-headers, hereinafter referred to, or the manifold connecting the said tube-headers with the receiving-drum; and the invention consists in certain novel features of construction whereby essential parts are reduced in size and assembled in a manner that will permit the necessary expansion incident to the high pressure used without racking the joints between such parts, and whereby the strains brought upon the joints are subdivided and shared by a plurality of parts.

The invention also consists of certain improved constructions relating to the joints themselves that connect the receiving-drums above the tubes with the tube-headers or with the manifold intermediate between the tube-headers and the drum; and in order to enable others skilled in the art to which my invention appertains to understand and construct the same, I will proceed to describe the features thereof in detail with reference to the accompanying drawings, in which like letters of reference indicate corresponding parts throughout, and in which—

Figure 2:
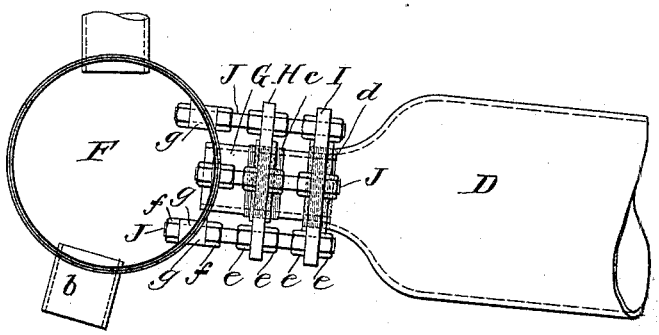
Figure 1:
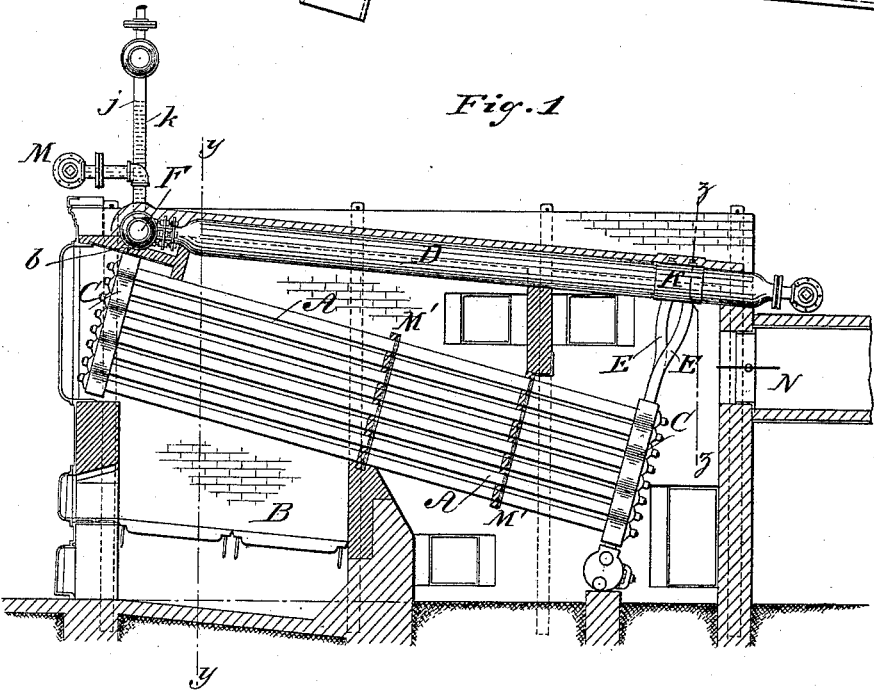
Figure 3:
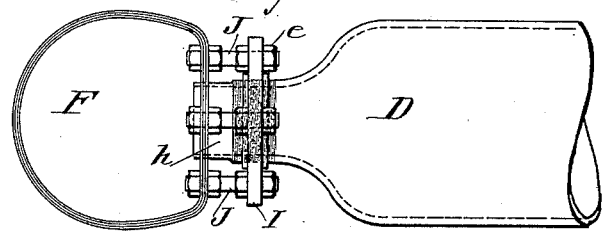
Figure 4:
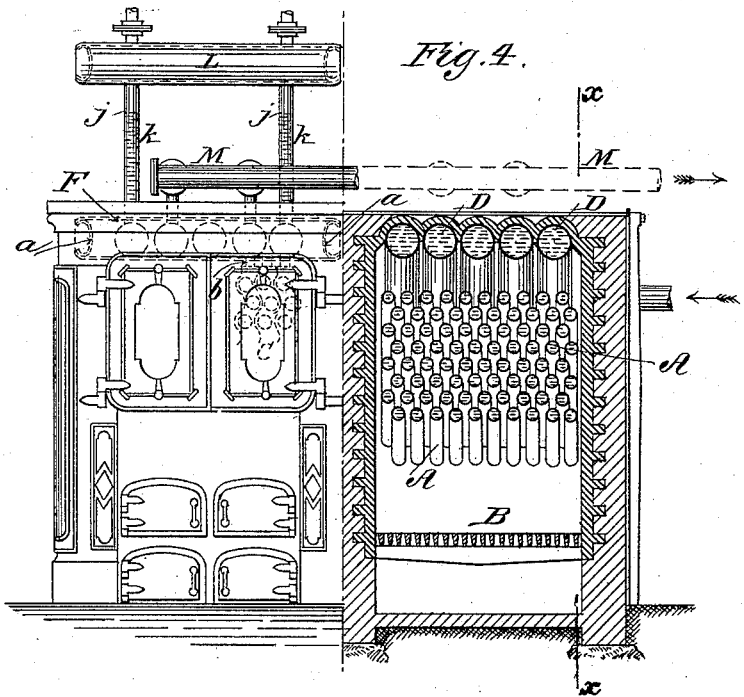
Figure 5:
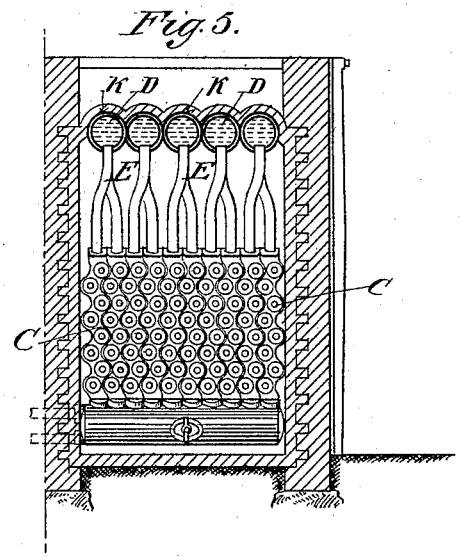
Figure 6:
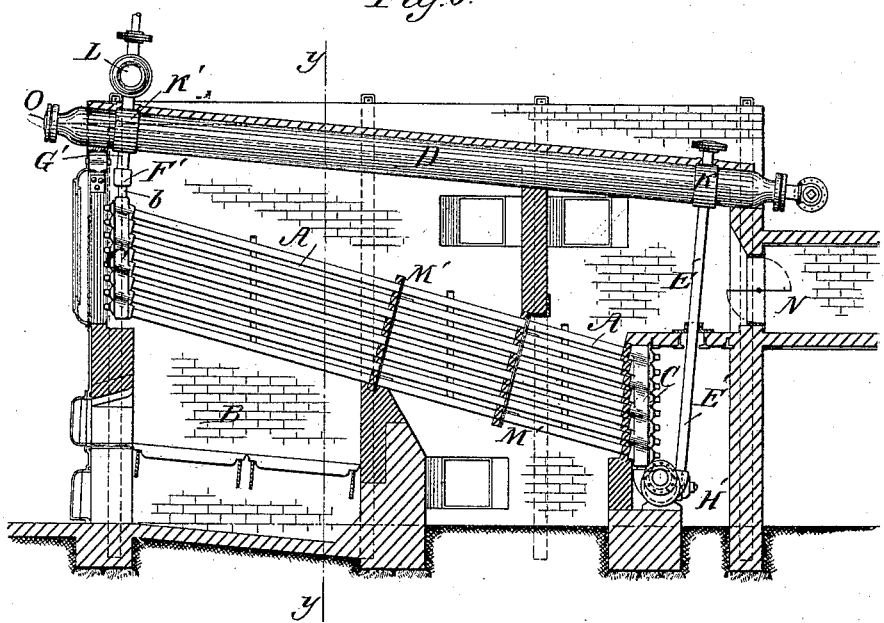

Figure 1 is a sectional elevation taken lengthwise of the boiler through the foundations on the line $x\ x$ of Fig. 4; Fig. 2, an enlarged detail view of the connecting-joint employed for connecting the receiving-drum with the manifold in Fig. 1; Fig. 3, a modification of Fig. 2; Fig. 4, a front elevation, partly in cross-section, on the line $y\ y$ of Fig. 1; Fig. 5, a rear cross-sectional elevation of Fig. 1; Fig. 6, a sectional elevation taken longitudinally of the boiler in the plane of the line $x\ x$, Fig. 4, showing a modification of the invention; and Fig. 7 a front elevation, partly in cross-section, on the line $y\ y$ of Fig. 6.

A A, Fig. 1, are the successive series of inclined water-tubes, their positions as appearing in cross-section in Fig. 4 being staggered vertically, whereby the tubes of one horizontal cross-series lie vertically opposite the intervening spaces of adjacent series above or beneath them in the manner common in water-tube boilers. The tubes are placed in the ordinary inclined position, highest at the front and lowest at the back, with the furnace B of any usual or suitable general construction underneath the front or elevated end. The hot products of combustion pass between the staggered tubes A, above and beneath the respective bridge-block partitions M' M', thence to the exit N. The vertical headers C C correspondingly connect the staggered tubes at the front and rear ends of the structure in single vertical series, whereby a single tube of each horizontal cross-series has communication with an individual header, the ends of the tubes being expanded into the headers in the usual manner to connect with the interiors thereof; and in order to correspond with the staggered position of the tubes the headers are of the usual serpentine form, having alternately-staggered openings to receive the tubes. I prefer to employ headers C C that are constructed of wrought metal pressed by means of sectional dies from straight polygonal tubes into the corrugated form by a process heretofore described in various patents.

D D, &c., are the receiving-drums corresponding with the usual steam-drums of a sectional steam-boiler, adapted to receive the highly-heated water delivered from the upper ends of the inclined water-tubes through a manifold or connecting box F, the current of circulation passing thence rearwardly through the parallel drums and downward through the downtake-pipes E to the rear tube-headers C. For the purposes of the present invention the drums D are preferably constructed of wrought-metal tubing of the necessary diameter, and their terminations are formed by a reduction of size or necked formation at their ends, which ends are flanged to receive a suitable cap, as O, at the front, as in Fig. 6, or a pipe connection, as shown at the rear ends in Figs. 1 and 6, or the reduced ends may be screw-threaded to receive separate flanges, as in Figs. 2 and 3, and as more particularly hereinafter described. Otherwise the tubular drums may be left of full diameter at the ends and fitted with separate flanged heads welded into them, as described in a separate application filed simultaneously herewith, Serial No. 301,951.

The manifold F is constructed of cylindrical tubing extending transversely the width of the structure, which may also be terminated by a reduction at the ends to receive a small cap, but is preferably terminated by concave flanged heads $a$, appearing in dotted lines in Fig. 4, over the margins of which the ends of the tube are reduced and welded, as indicated. The manifold F may be also made in polygonal form in cross-section instead of cylindrical, as indicated at F′ in Figs. 6 and 7.

The upper ends of the front headers C are severally connected with the manifold or connecting-box F or F′ by suitable expanded nipples or short tubes at $b$, and the said connecting-box in the instance of F′ is connected by similar expanded nipples or short tubes G′ to each of the overhanging receiving-drums D.

As illustrated in Figs. 1 to 4, inclusive, in which the connecting-box F is placed on a level with the ends of the receiving-drum D, the connection is made between said connecting-box F and receiving-drum D by the novel construction of the joint illustrated in detail by Figs. 2 and 3.

In Fig. 2 the reduced or necked portion of the drum D is screw-threaded on its exterior to receive a flange I, through which the several stay-bolts J extend from the shell F and retain the parts together in a rigid position with relation one to another. G is a connecting-nipple or short tube that is expanded into the shell F and into the reduced end of the drum. The nipple G is also screw-threaded on its exterior to receive a flange H, and through this flange H the stay-bolts J also extend. The stay-bolts J are provided with jam-nuts $f$, that secure them into the sides of the shell F, the said bolts having beveled washers $g$ to provide a suitable seat for the nuts $f$ where the bolts intersect inclined portions of the cylindric shell, as shown. The stay-bolts J are also provided with jam-nuts $e$, that secure the flange H of the nipple and the flange I of the drum to them and with proper relation to each other.

In Fig. 3 the reduced or necked portion of the drum D is screw-threaded on its exterior in a similar manner and for a similar purpose as in Fig. 2. The separate nipple G is, however, dispensed with and a continued portion of the drum-neck that is reduced in thickness is left in its stead, the same being expanded into the shell F by a suitable expanding-tool.

The stay-bolts J are similarly employed, as in Fig. 2, to clamp up and stay the flange I.

In Fig. 3 I also show a modified feature of the shell F, consisting in flattening its side at that portion of its surface intersected by the drum-neck and its connecting-bolts. Such a feature is equally applicable to the construction in Fig. 2. The bolts J in both modifications may be employed in any desired number, and they serve to rigidly hold the connected parts in a fixed relation both longitudinally and laterally, for the purpose of insuring against racking of the joints or any degree of displacement of the expanded surfaces of the metal.

At the opposite ends of the drums the tubes E are adapted to yield to the differences of expansion between the drums and the water-tubes A, and to this purpose the said tubes E are made of a spiral curvilinear form, such form serving, also, the purpose of connecting each drum with a plurality of the headers C, as illustrated by the rear elevation, Fig. 5. The ends of the tubes E are expanded into the metal of the drums; but to insure firmness of the joint so formed there is also a wrought-iron ring K, that is secured by being shrunk on the drum after being heated, and that affords an increased thickness of the metal into which the tube is expanded, and an extended surface therefore which holds the tube rigidly. A similar shrunk collar, as K′, may also be similarly employed upon the drum D to receive the connecting nipples or tubes between the same and the manifold F′ in Fig. 6, as illustrated. The wrought-iron ring or collar K also has for its function to re-enforce the shell of the drum at those points that would otherwise be weakened by the perforations.

In the illustration of Fig. 6 I have also shown the adaptability to the invention of downtake-pipes E′ of prolonged length in lieu of the curved pipes E of less length, the said pipes E′ being employed in series, transversely corresponding with each drum D, and connected therewith and directly to the mud-drum beneath the lower extremities of the rear tube-headers C. The vertical elongation thereby attained in the vertical downtake-pipes E′ promotes a suppleness of the connection that is equivalent to that obtained by the curvilinear form given to the short pipes E of Fig. 1, and the differences of linear expansion between the water-tubes A and the drums D will not materially affect the joints of the pipes E′ within the collar K and within the openings of the mud-drum.

L is a steam expansion-drum used in connection with the receiving-drums D in the practice of water-superheating, incident to which practice the water-level is above the drums D, as at $j$, Fig. 4, in the vertical pipes $k$, and variation in the expansion of the water due to an increase or decrease of temperature is permitted without great fluctuation of pressure by the elasticity of the steam-space in said expansion-drum. The expansion-drum L may be of any suitable construction, but as represented is of similar form and construction to that of the connecting-box F in Figs. 1 and 4.

Figure 7:
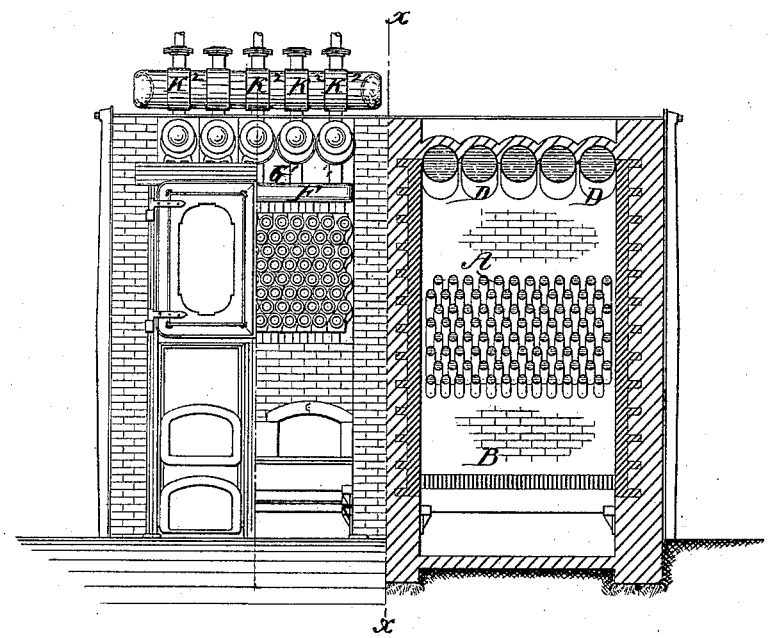

It will be observed that, as shown in Fig. 7, the feature of employing shrunk re-enforcing rings $K^2$ is likewise applicable for receiving the expanded ends of connecting-tubes connecting with the expansion-drum L.

M are the delivery-pipes employed to conduct the superheated water to the places where it is used for steam-generation or other suitable purposes.

Having thus fully described my invention, I claim and desire to secure by Letters Patent—

1. In a water-tube boiler, the combination, with its cross-series of vertical headers that connect adjacent ends of the water-tubes, and the cross-series of longitudinal receiving-drums above said water-tubes, of a transverse separate connecting-box that communicates intermediately with said headers and said drums by means of independent tubes projected severally from the headers and severally from the drums into said connecting-box.

2. In a water-tube boiler, the combination of a receiving-drum terminated by a necked end, a transverse connecting-box connected to said receiving-drum by the expansion of its necked end in the manner described into an aperture of said connecting-box, through which communication is established between the latter and the said drum, a flange secured to the exterior of the drum-neck, and the stay-bolts extending between said flange and portions of the connecting-box opposite thereto about the said aperture, adapted to stay the said parts relatively to each other, for the purposes described.

3. In a water-tube boiler, the combination of a receiving-drum terminated by a necked end, a transverse connecting-box opposite said necked end, a connecting nipple or tube expanded at one end into the said necked end of the drum and at its opposite end into an aperture of the connecting-box, by which communication is established between the latter and the said drum, flanges secured to the exterior of the drum-neck and to the exterior of the nipple or tube, and the stay-bolts extending through and connected with said flanges and to portions of the connecting-box opposite thereto about said aperture, adapted to stay the said parts relatively to each other, for the purposes set forth.

4. In a water-tube boiler, the herein-described receiving-drum necked at its end to join with a connecting-box, the neck of said drum having a thicker portion that is exteriorly screw-threaded to receive a flange by which the joint is stayed, as described, said neck also having a thinner portion that is extended beyond its thicker portion and adapted to be inserted and expanded into an aperture of said connecting-box, by which communication is established between the latter and the drum.

5 In a water-tube boiler, the combination, with a cross-series of vertical headers connecting adjacent ends of the water-tubes, of a cross-series of longitudinal receiving-drums above said water-tubes and the headers, and the herein-described curvilinear downtake-pipes adapted to connect a plurality of said headers with a single of said drums and to promote a yielding connection between the same, as set forth.

6. In a water-tube boiler, the combination, with a seamless drum-cylinder, of a re-enforcing ring shrunk upon the exterior of said cylinder, adapted to give an increased bearing-surface to a tube intersecting said cylinder and said re-enforcing ring expanded therein to form a joint.

NAT. W. PRATT.

Witnesses:
C. W. FORBES,
HENRY F. PARKER.